Patented June 12, 1951

2,556,462

UNITED STATES PATENT OFFICE 2,556,462

PREPARATION OF HALOSILANES

Arthur J. Barry and Donald E. Hook, Midland, and Lee De Pree, Holland, Mich., assignors to The Dow Chemical Company, Midland, Mich., a corporation of Delaware No Drawing. Application January 5, 1948, Serial No. 640

8 Claims. (Cl. 260—448.2)

This invention relates to the preparation of halosilanes.

In our copending application Ser. No. 674,925, it is shown that an olefinic hydrocarbon may be caused to combine chemically with a halomonohydrosilane such as $HSiCl_3$, to produce an alkylhalosilane. It is also shown in our copending application Ser. No. 674,926, that olefins may be reacted with organodihalosilanes of the type type ($RHSiX_2$), where R is an alkyl or aryl radical to produce the corresponding diorganodihalosilanes.

It is an object of this invention to provide a convenient and economical method for the preparation of organohalosilanes in which a silicon atom is bonded directly to a carbon atom in a fused ring aromatic hydrocarbon radical.

In accordance with the present invention, a fused ring aromatic hydrocarbon is reacted with a polyhalomonohydromonosilane, at a temperature above 300° C., under sufficient pressure so that at least a portion of the reaction mixture is present as a condensed phase. By the process of this invention there is produced a halosilane containing a fused ring hydrocarbon radical, in which silane one valence of the silicon atom is satisfied by direct linkage to a carbon atom in the fused ring structure.

Suitable fused ring hydrocarbons employed in accordance with the present invention are listed in the following table.

TABLE naphthalene
dihydronaphthalene
alpha-methylnaphthalene
beta-methylnaphthalene
anthracene
phenanthrene
fluorene Halomonohydrosilanes which may be employed are halosilanes in which more than one halogen atom and a hydrogen atom are each bonded to the silicon atom and any remaining valence of said silicon atom is satisfied by a monovalent hydrocarbon radical. It has been shown in our application Number 674,926, that the identity of such a hydrocarbon radical attached directly to the silicon atom has little or no influence upon the operability of said halomonohydrosilane in processes of the type with which this invention is concerned. Accordingly, any chlorosilane of the class of $HSiCl_3$ and $RHSiCl_2$, where R is a monovalent hydrocarbon radical, such as an aryl or alkyl radical, is satisfactory for use herein. Examples of such compounds include monohydrotrichlorosilane, $HSiCl_3$, monomethyldichlorosilane, $CH_3SiHCl_2$, monophenyldichlorosilane, $C_6H_5SiHCl_2$.

In a preferred mode of operation, the reactants are employed in approximately equimolar ratio, although the process may be conducted with an excess of either of the reactants. However, based upon economics and the law of mass action, it is preferable to have less than 10 mols of either of the reactants per mol of the other reactant. The mixture of fused ring hydrocarbon and halomonohydrosilane is preferably heated at a temperature of from 300° to 480° C. under sufficient pressure that at least a portion of said mixture is in condensed or liquid phase.

The reaction may be carried out in any equipment conventionally employed for pressure reactions. A convenient method is to charge a sufficient volume of the reactants into a pressure autoclave that there will remain a liquid phase when the autoclave is heated to the preferred temperature range. The pressure developed therein will generally be above 300 pounds per square inch. Under these conditions reaction takes place.

An alternative mode of operation of the process hereof involves heating the hydrocarbon to between 300° and 480° C. under a somewhat lower pressure but sufficient to maintain liquid phase. The silane may then be introduced into the lower portion of the molten hydrocarbon. The silane will dissolve in the hydrocarbon and react therewith. When hydrogen is evolved, it may be released from the system gradually to avoid building up high pressure in the reactor.

Operating in the manner above described, the reaction proceeds with the formation of products which contain halosilyl groups bonded directly to carbon atoms in the fused ring structure. Two types of these materials may be thereby obtained. In one type, a chlorosilyl radical is a substituent in a benzenoid ring, as for example in naphthyltrichlorosilane. In the other type of material, a chlorosilyl radical is a substituent in a polyhydro-ring structure, as for example, in a trichlorosilyl derivative of dihydro- or tetrahydronaphthyltrichlorosilane. A preferred operation is to conduct the reaction at between 300° and 380° C. for the production of these hydro-derivatives of the reaction products formed from the hydrocarbons of the table. Upon continued heating especially at higher temperature, said chlorosilyl derivatives of polyhydro-fused ring hydrocarbons undergo dehydrogenation, with the elimination of molecular hydrogen. By operation in the higher temperature range augmented yields of the benzenoid type of derivative, such as the naphthyltrichlorosilane are obtained.

In each of the examples, the reactants were placed in a bomb, which was then closed and heated at the temperature indicated. In each run, some condensed phase was present during the heating period given.

EXAMPLES

Example 1

A mixture of 380 grams of naphthalene and 407 grams of monohydrotrichlorosilane was heated in a bomb of 2.4 liter capacity for 22 hours at a temperature of from 365° to 380° C. During the heating period the maximum pressure developed within the bomb was 800 pounds per square inch. The bomb was allowed to cool to about 100° C., and vented through a cold trap. The reaction product was fractionally distilled.

Approximately 210 grams of material distilled in the range of from 145° to 156° C. at 10-11 millimeters absolute pressure. This material was liquid at ordinary temperatures, and had a density of 1.317 at 20° C. It consisted of approximately 75 parts by weight of dihydronaphthyltrichlorosilane, $C_{10}H_9SiCl_3$, and 25 parts of naphthyltrichlorosilane, $C_{10}H_7SiCl_3$.

Example 2

A mixture of 2305 grams of naphthalene and 3668 grams of monohydrotrichlorosilane was heated in a bomb of 14.4 liter capacity for 16 hours at a temperature of from 370° to 375° C. During the heating period the maximum pressure developed within the bomb was 1230 pounds per square inch. The bomb was allowed to cool to about 100° C., and was then vented through a cold trap. The reaction product was fractionally distilled.

The fraction which distilled at from 160° to 183° C. at 30 millimeters absolute pressure amounted to about 725 grams and comprised a mixture of hydronaphthyltrichlorosilanes. This fraction was redistilled. The cut boiling at from 178°-180° C. at 30 millimeters absolute pressure was a liquid and was identified as tetrahydronaphthyltrichlorosilane.

About 700 grams of product distilled at 183°-185° C. at 30 millimeters absolute pressure. It was crystalline at room temperature, and melted at 44°-49° C. Analysis showed it to be beta-naphthyltrichlorosilane, heretofore not known in the art.

The fraction distilling at from 220°-233° C. at 30 millimeters absolute pressure amounted to approximately 530 grams, and consisted for the most part of bis(trichlorosilyl) tetrahydronaphthalene.

About 750 grams of material which was green by reflected light and yellow by transmitted light, distilled above 150° C. at 0.4 millimeter. It comprised a complex mixture of naphthalenic compounds containing silicon and hydrolyzable chlorine.

Example 3

A mixture of 395 grams of naphthalene and 418 grams of monohydrotrichlorosilane was heated in a 2.4 liter bomb for 16 hours at a temperature of from 450° to 470° C. The maximum pressure developed within the bomb was 1425 pounds per square inch.

The principal product was a mixture of white crystalline solid and colorless liquid, and distilled at 143°-146° C. at 6 millimeters absolute pressure. Analysis showed the presence of about 70 per cent by weight of naphthyltrichlorosilane, $C_{10}H_7SiCl_3$ and 30 per cent of dihydronaphthyltrichlorosilane, $C_{10}H_9SiCl_3$.

Example 4

A mixture of 475 grams of anthracene and 362 grams of monohydrotrichlorosilane was heated for 16 hours in a 2.4 liter bomb at a temperature of from 358° to 368° C. and a maximum pressure of 380 pounds per square inch. A brown pasty mass was obtained which was fractionally distilled. It distilled for the most part at from 190° to 201° C. at 1.4 millimeters absolute pressure, and contained anthryl trichlorosilane and dihydroanthryltrichlorosilane.

Example 5

A mixture of 535 grams of phenanthrene and 407 grams of monohydrotrichlorosilane was heated in a 2.4 liter bomb for 16 hours at a temperature of from 355° C. to 365° C. Fractional distillation of the product yielded approximately 195 grams of material distilling at from 195° to 213° C. at 2.1-2.2 millimeters absolute pressure. The main portion of the material distilled at 205-208° C. at said pressure. It consisted of 60 per cent by weight of dihydrophenanthryltrichlorosilane and 40 per cent of phenanthryltrichlorosilane.

Example 6

In a series of runs, alpha-methylnaphthalene and beta-methylnaphthalene were each reacted with monohydrotrichlorosilane, in a bomb. In each case the reactants were employed in equimolecular ratio. In each run there were obtained naphthyltrichlorosilane and trichlorosilylmethylnaphthalenes. In the two low temperature runs there were also obtained hydro-derivatives of the latter. The following table shows the particular hydrocarbon employed in each instance, the temperature at which the bomb was heated for a period of 16 hours, and the maximum pressure expressed as pounds per square inch attained within the bomb during the heating period.

| Hydrocarbon | Temperature | Pressure |
|---|---|---|
| | °C. | Lbs. per sq. in. |
| alpha-methyl napthalene | 360-368 | 800 |
| Do | 442-455 | 1,200 |
| beta-methyl naphthalene | 357-370 | 740 |
| Do | 442-452 | 1,150 |

Example 7

A mixture of 493.6 grams of flourene and 406 grams of monohydrotrichlorosilane was heated for 16 hours in a 2.4 liter bomb. During the run the average temperature within the bomb was 360° C. and the maximum pressure was 780 pounds per square inch. Fractional distillation of the reaction product yielded approximately 142 grams of material distilling principally within the range of 190°-197° C., at 3.7 millimeters absolute pressure. This chlorosilyl derivative of flourene was a white, semi-crystalline, pasty mass at room temperature.

Example 8

A mixture of 397 grams of naphthalene and 407 grams of monomethyldichlorosilane, $CH_3SiHCl_2$, was heated in a 2.4 liter bomb for 16 hours at a temperature of from 368° to 375° C., and a maximum pressure of 680 pounds per square inch. A mixture of naphthylmethyldichlorosilane and dihydronaphthylmethyldichlorosilane was obtained.

Example 9

When three gram mols of dihydronaphthalene and three gram mols of monohydrotrichlorosilane are charged to a 2.4 liter bomb and heated for 16 hours at 360° C. and allowed to cool, the reaction product will contain a mixture of products, principally dihydronaphthylsilicon trichloride and tetrahydronaphthylsilicon trichloride.

What is claimed is:

1. The process which comprises reacting a fused ring aromatic hydrocarbon of the group consisting of naphthalene, dihydronaphthalene, alpha-methylnaphthalene, beta - methylnaphthalene, anthracene, phenanthrene and fluorene, with a polyhalomonohydromonosilane of the general formula $R_nHSiCl_{3-n}$, in which R represents a monovalent hydrocarbon radical free of aliphatic unsaturation and $n$ has a value of from 0 to 1 inclusive, at a temperature of at least 300° C. under pressure sufficient that at least a portion of the reaction mixture is in a condensed phase, whereby there is produced an organohalosilane in which one valence of the silicon atom is satisfied by direct linkage to a carbon atom in a fused ring structure.

2. The process which comprises reacting a fused ring aromatic hydrocarbon of the group consisting of naphthalene, dihydronaphthalene, alpha-methylnaphthalene, beta - methylnaphthalene, anthracene, phenanthrene and fluorene, with a polyhalomonohydromonosilane of the general formula $R_nHSiCl_{3-n}$, in which R represents a monovalent hydrocarbon radical free of aliphatic unsaturation and $n$ has a value of from 0 to 1 inclusive, at a temperature of from 300° to 480° C. under pressure sufficient that at least a portion of the reaction mixture is in a condensed phase, whereby there is produced an organohalosilane in which one valence of the silicon atom is satisfied by direct linkage to a carbon atom in a fused ring structure.

3. The process which comprises reacting a fused ring hydrocarbon of the group consisting of naphthalene, dihydronaphthalene, alpha-methylnaphthalene, beta-methylnaphthalene, anthracene, phenanthrene and fluorene, with a chloromonohydrosilane which contains more than one chlorine atom and one hydrogen atom each attached to the silicon atom, any remaining valence of said silicon atom being satisfied by a monovalent hydrocarbon radical free of aliphatic unsaturation, at a temperature of from 300° to 480° C., under pressure sufficient that at least a portion of the reaction mixture is in a condensed phase, whereby an organochlorosilane is produced in which one valence of the silicon atom is satisfied by direct linkage to a carbon atom in a fused ring structure.

4. The process which comprises reacting a fused ring hydrocarbon of the group consisting of naphthalene, dihydronaphthalene, alpha-methylnaphthalene, beta-methylnaphthalene, anthracene, phenanthrene and fluorene, with a chloromonohydrosilane which contains more than one chlorine atom and one hydrogen atom each attached to the silicon atom, any remaining valence of said silicon atom being satisfied by a monovalent hydrocarbon radical free of aliphatic unsaturation, at a temperature of from 300° to 380° C., under pressure sufficient that at least a portion of the reaction mixture is in a condensed phase, whereby an organochlorosilane is produced in which one valence of the silicon atom is satisfied by direct linkage to a carbon atom in a fused ring structure.

5. The process which comprises reacting a fused ring hydrocarbon of the group consisting of naphthalene, dihydronaphthalene, alpha-methylnaphthalene, beta-methylnaphthalene, anthracene, phenanthrene and fluorene, with monohydrotrichlorosilane, $HSiCl_3$, at a temperature of from 300 to 480° C., under pressure sufficient that at least a portion of the reaction mixture is in a condensed phase, whereby there is produced an organochlorosilane which contains a trichlorosilyl group bonded directly to a carbon atom in the fused ring structure.

6. The process which comprises reacting naphthalene with monohydrotrichlorosilane, $HSiCl_3$, at a temperature of from 300° to 480° C., under pressure sufficient that at least a portion of the reaction mixture is in a condensed phase, whereby there is produced a trichlorosilyl derivative of naphthalene.

7. The process which comprises reacting a fused ring hydrocarbon of the group consisting of naphthalene, dihydronaphthalene, alpha-methylnaphthalene, beta-methylnaphthalene, anthracene, phenanthrene and fluorene, with monomethyldichlorosilane,

at a temperature of from 300° to 480° C., under pressure sufficient that at least a portion of the reaction mixture is in a condensed phase, whereby there is produced an organochlorosilane which contains a methyldichlorosilyl group bonded directly to a carbon atom in the fused ring structure.

8. The process which comprises reacting naphthalene with monomethyldichlorosilane,

at a temperature of from 300° to 480° C., under pressure sufficient that at least a portion of the reaction mixture is in a condensed phase, whereby there is produced a methyldichlorosilyl derivative of naphthalene.

ARTHUR J. BARRY.
DONALD E. HOOK.
LEE DE PREE.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 30, 1946 |
| 2,443,898 | Ellingboe | June 22, 1948 |

OTHER REFERENCES

Volnov, "Jour. Gen. Chem." (USSR), vol. 10 (1940), pages 1600–1604.